United States Patent Office 3,597,218
Patented Aug. 3, 1971

3,597,218
METHOD FOR PREPARATION OF FEED
Seiko Matsuoka, 9-30 Yanagi-machi, Nase-shi,
Kagoshima-ken, Japan
No Drawing. Filed Sept. 4, 1968, Ser. No. 757,501
Claims priority, application Japan, Sept. 6, 1967,
42/57,671
Int. Cl. A23k 1/00
U.S. Cl. 99—9          3 Claims

ABSTRACT OF THE DISCLOSURE

A method of preparing an animal feed from bagasse which comprises culturing a cellulose-decomposing microorganism, a nitrate-forming microorganism, a starch-hydrolyzing and proteolytic microorganism, and a lignin-decomposing microorganism together in a medium consisting of wheat bran and rice bran to obtain a composite inoculum, inoculating bagasse with said inoculum and culturing it for 24 hours.

BACKGROUND OF THE INVENTION

This invention relates to a method of preparing a feed having high digestibility from undigestible bagasse (sugar cane from which sugar juice has been extracted) containing cellulose and lignin by applying an enzyme which decomposes cellulose and lignin.

It has been known that cellulose, pectin and sugars are digested by ruminants, but that bagasse containing lignin cannot be utilized as a feed for animals since lignin is not digested even by ruminants, and further it adversely affects the digestion of the other cellulose materials.

The object of this invention is to provide a method of easily preparing a feed having high digestibility from bagasse containing lignin, cellulose, etc. which has never been utilized as a feed.

SUMMARY OF THE INVENTION

The present inventor succeeded in preparing an animal feed having high digestibility by culturing a cellulose-decomposing microorganism, a nitrate-forming microorganism, a starch-hydrolyzing and proteolytic microorganism and a lignin-decomposing microorganism together in a medium containing wheat bran and rice bran to obtain a composite inoculum, and inoculating bagasse containing cellulose and lignin with said inoculum to convert the bagasse to an animal feed having high digestibility.

The medium used for culturing the above microorganisms is prepared by pouring warm water into a mixture consisting of wheat bran and rice bran in the proportion of about 2.1 kg. to about 0.9 kg., and then stirring the resulting mixture.

It is preferred that the inoculation and cultivation of the above composite inoculum be carried out at a pH in the range of 4.0–5.0 and a temperature of 30–45° C.

The bagasse used as raw material generally contains 22.5% by weight of lignin when it contains 10.3% by weight of water. The low digestibility of raw bagasse is due to such a high lignin content.

DESCRIPTION OF PREFERRED EMBODIMENT

The following example illustrates a preferred embodiment of this invention, and it will be understood that the invention is not limited thereto.

EXAMPLE

A mixture consisting of 2.1 kg. of what bran and 0.9 kg. of rice bran was charged into a barrel, and while stirring, 7 kg. of warm water at 37° C. was poured into the mixture to adjust the water content thereof to about 70%. The resulting mixture was then inoculated with Irpex consorus, a nitrate-forming microorganism such as Nitrobacter, a starch-hydrolyzing and proteolytic microorganism such as Aspergillus niger, and a Penicillium microorganism which decomposes pectin, and the microorganisms were cultured at room temperature for about 12 hours to obtain a composite inoculum.

Into a separate barrel, 1,000 kg. of bagasse and 700 kg. of raw spirits lees were charged and stirred. The mixture was then seeded with 10 kg. of the above inoclum, which was cultured at 37° C. for 24 hours. The harvested culture was dried to obtain a feed having high digestibility.

The reason for the addition of raw spirits lees to the bagasse is that the bagasse absorbs the water in the raw spirits lees thereby promoting the decomposition of the tissue of the bagasse by the microorganisms, while the proteins contained in the raw spirits lees are decomposed by the proteolytic microorganism and serve as sources of nutrient along with the sugars in the spirits lees.

The nitrate-forming microorganism such as Nitrobacter oxidizes the ammonia or nitrite generated by the other microorganisms to nitrogen, which, together with the sugars produced from starch by the starch-hydrolyzing microorganism such as Aspergillus niger, promotes the growth of Irpex consorus thereby decomposing not only the cellulose but also the lignin in the bagasse to make them digestible.

The following table indicates the composition of the feed obtained in the preceding example, in comparison with that of the untreated bagasse.

|   | Product obtained in example (percent) | Untreated bagasse (percent) |
| --- | --- | --- |
| Water content | 11.7 | 10.7 |
| Crude proteins | 13.34 | 2.3 |
| Crude fats | 10.03 | 0.7 |
| Crude fibrous materials | 14.38 | 34.2 |
| Crude ash | 8.93 | 5.8 |
| Soluble non-nitrogenous materials | 41.4 | 46.3 |

From the above table, it is understood that, in the product prepared by the method of this invention, the crude fibrous materials including lignin are decomposed and decreased in amount by about 20%, and the crude proteins are increased about six times those in the untreated bagasse, thereby greatly increasing the efficacy of the product as a feed.

The feed prepared by the method of this inevntion was tested with cows for secretion of milk, and the following results were obtained.

(1) Feeding conditions (a) Test cows:
    Blended feed—7 kg.
    Feed of this invention—4 kg.
(b) Control cows:
    Blended feed—7 kg.
    Green grass, straw, etc.—4 kg.

(2) Amount of milk secreted (average)

(a) Test cows:
    17.7 kg./day
    Quality—4% fat
(b) Control cows:
    13.4 kg./day
    Quality—3% fat It is understood from the above results that, when the feed prepared by the method of this invention is fed, the amount of milk increased more than 30% as compared with that in the case of control cows which received common feeds.

I claim:
1. A method of preparing an animal feed of high digestibility from bagasse containing cellulose and lignin, which comprises inoculating an aqueous culture medium of wheat and rice bran with *Irpex consorus,* Nitrobacter, *Aspergillus niger* and Penicillium, culturing the microorganisms in said medium for about 12 hours at a temperature of about 30° C. to 45° C. to obtain a composite inoculum, mixing the bagasse with raw spirit lees, inoculating the mixture with said composite inoculum, and culturing the mixture with the inoculum for about 24 hours at an approximate temperature of 37° C. to promote the growth of the *Irpex consorus* and thus to decompose the cellulose and lignin in the bagasse.

2. The method of claim 1, wherein water having a temperature of about 37° C. is mixed with the bran to produce the culture medium.

3. The method of claim 1, wherein the mixture comprises, by weight, about 10 parts of the bagasse and about 7 parts of the raw spirit lees.

References Cited

UNITED STATES PATENTS 2,636,823    4/1953    Becze ................. 99—9
3,243,299    3/1966    Mecho ................ 99—9

LIONEL M. SHAPIRO, Primary Examiner

R. M. ELLIOTT, Assistant Examiner

U.S. Cl. X.R.

195—111